United States Patent
Huang et al.

(10) Patent No.: US 11,924,410 B2
(45) Date of Patent: Mar. 5, 2024

(54) VIDEO CODING USING OVERLAPPED BLOCK MOTION COMPENSATION, COMBINED INTER-INTRA PREDICTION, AND/OR LUMA MAPPING AND CHROMA SCALING

(71) Applicant: QUALCOMM Incorporated, San Diego, CA (US)

(72) Inventors: Han Huang, San Diego, CA (US); Yao-Jen Chang, San Diego, CA (US); Vadim Seregin, San Diego, CA (US); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/662,140

(22) Filed: May 5, 2022

(65) Prior Publication Data

US 2022/0394239 A1 Dec. 8, 2022

Related U.S. Application Data

(60) Provisional application No. 63/197,190, filed on Jun. 4, 2021.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/51* (2014.11); *H04N 19/593* (2014.11); *H04N 19/70* (2014.11)

(58) Field of Classification Search
CPC .... H04N 19/105; H04N 19/176; H04N 19/51; H04N 19/593; H04N 19/70
See application file for complete search history.

(56) References Cited

U.S. PATENT DOCUMENTS

2020/0404298 A1* 12/2020 Kuo ................. H04N 19/132
2021/0321121 A1* 10/2021 Zhang ................ H04N 19/70

OTHER PUBLICATIONS

Abdoli (Ateme) M., et al., "Non-CE3: Decoder-Side Intra Mode Derivation (DIMD) with Prediction Fusion Using Planar", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0449-V2, m48570, Jul. 4, 2019, XP030219611, XP030219610, pp. 1-9.

(Continued)

*Primary Examiner* — Jae N Noh
(74) *Attorney, Agent, or Firm* — Shumaker & Sieffert, PA

(57) ABSTRACT

An example device for decoding video data includes one or more processors implemented in circuitry and configured to: generate an inter-prediction block for a current block of video data; generate an intra-prediction block for the current block of video data; generate a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of video data using the final prediction block. To generate the final prediction block, the processors may perform LMCS on a first inter-prediction sub-block, combine the LMCS-mapped first inter-prediction sub-block with the intra-prediction block using CIIP, and perform OBMC between the first CIIP prediction block and a second inter-prediction sub-block.

12 Claims, 10 Drawing Sheets

SUB-BLOCKS TO WHICH OBMC APPLIES

(51) Int. Cl.
    *H04N 19/51*    (2014.01)
    *H04N 19/593*   (2014.01)
    *H04N 19/70*    (2014.01)

(56) References Cited

OTHER PUBLICATIONS

Bossen F., et al., "VTM Common Test Conditions and Software Reference Configurations for SDR Video", JVET-T2010-v1, Joint Video Experts Team (JVET) of ITU-T SG 16 WP 3 and ISO/IEC JTC 1/SC 29, 20th Meeting, by teleconference, Oct. 7-16, 2020, pp. 1-7.

Bross B., et al., "Versatile Video Coding Editorial Refinements on Draft 10", JVET-T2001-v2, 20. JVET Meeting, Oct. 7, 2020-Oct. 16, 2020, Teleconference, (The Joint Video Experts Team of ISO/IEC JTC1/SC29/WG11 and ITU-T SG 16), Nov. 24, 2020 (Nov. 24, 2020), pp. 1-515.

Chang Y-J., et al., "Compression Efficiency Methods Beyond VVC", 21. JVET Meeting, Jan. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, pp. 1-13.

Chang Y-J., et al., (Qualcomm): "EE2: Tests of Compression Efficiency Methods Beyond VVC", 22. JVET Meeting, Apr. 20, 2021-Apr. 28, 2021, Teleconference, (The Joint Video Exploration Team of ISO/IEC JTC1/SC29/WG11 and ITU-T SG.16 WP 3), No. JVET-V0120-V2, m56535, Apr. 22, 2021, pp. 1-31.

Chen J., et al., "Algorithm Description for Versatile Video Coding and Test Model 10 (VTM 10)", 19, JVET Meeting, Jun. 22, 2020-Jul. 1, 2020, Teleconference, (The Joint Video Exploration Team of ISO/IEC JTC1/SC29/WG11 and ITU-T SG.16), No. JVET-S2002-V1, Oct. 10, 2020, XP030302176, pp. 1-97.

Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, Aug. 19, 2017, XP030150980, 48 Pages.

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Han Y., et al., "CE4.4.6: Improvement on Merge/Skip Mode," JVET-L0399_r2, Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.

Henry F., et al., "Residual Coefficient Sign Prediction", 4th JVET Meeting, Oct. 15, 2016-Oct. 21, 2016, Chengdu, (The Joint Video Exploration Team of ISO/IEC JTC1/SC29/WG11 and ITU-T SG.16 WG 3), URL: http://phenix.int-evry.fr/vet/, No. JVET-D0031, Oct. 20, 2016 (Oct. 20, 2016), JVET-D0031-v2, JVET-D0031-v4, XP030150258, pp. 1-6.

International Search Report and Written Opinion—PCT/US2022/072165—ISA/EPO—dated Sep. 7, 2022, 14 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Li G., et al., "CE2-2.2: Affine Merge with Prediction Offset", JVET-N0378, Joint Video Experts Team (JVET) of ITU-T SG 16 WP 3 and ISO/IEC JTC 1/SC 29/WG 11, 14th Meeting: Geneva, CH, Mar. 17-29, 2019, pp. 1-5.

Liao R-L (Alibaba-Inc)., et al., "Non-EE2: On Combination of CIIP, OBMC and LMCS", 24. JVET Meeting, Oct. 6, 20211-Oct. 15, 2021, Teleconference, (The Joint Video Exploration Team of ISO/IEC JTC1/SC29/WG11 and ITU-T SG 16 WP3), No. JVET-X0090-v2, m57883, Oct. 8, 2021, XP030297952, pp. 1-4.

Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.

Lu (Dolby) T., et al., "CE12: Mapping Functions (test CE12-1 and CE12-2)", 13. JVET Meeting, Jan. 9, 2019-Jan. 18, 2019, Marrakech, (The Joint Video Exploration Team of ISO/IEC JTC1/SC29/WG11 and ITU-TSG.16), No. JVET-M0427, Jan. 3, 2019, XP030200493, pp. 1-13.

Ray B., et al., "Unified PDPC for Angular Intra Modes", JVET-Q391-v3, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.

Schwarz H., et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.

Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting, Gothenburg, SE, Jul. 3-12, 2019, pp. 1-5.

Seregin V., et al., "Block Shape Dependent Intra Mode Coding", 4th JVET Meeting, Chengdu, (The Joint Video Exploration Team of ISO/IEC JTC1/SC29/WG11 and ITU-T SG.16 WP 3), JVET-D0114r1, URL: http://phenix.int-evry.fr/jvet/, CN, Oct. 15-21, 2016, 3 pages.

Seregin V., et al., "Exploration Experiment on Enhanced Compression Beyond VVC Capability", 21. JVET Meeting, Jan. 6, 2021-Jan. 15, 2021, Teleconference, (The Joint Video Exploration Team of ISO/IEC JTC1/SC29/WG11 and ITU-T SG.16 WP 3), No. JVET-U2024-V2, m56284 Feb. 17, 2021, XP030293402, pp. 1-19.

Winken (Fraunhofer) M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, Marrakech, (The Joint Video Exploration Team of ISO/IEC JTC1/SC29/WG11 and ITU-TSG.16), No. JVET-M0425 Jan. 2019 (Jan. 7, 2019), pp. 1-14.

Zhang K., et al., "Enhanced Cross-Component Linear Model Intra-Prediction", JVET-D0110, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110-v3, pp. 1-6.

Zhao L., et al., "Non-CE: Weighted Intra and Inter Prediction Mode", Joint Video Experts Team (JVET) of ITU-T SG 16 WP 3 and ISO/IEC JTC 1/SC 29/WG 11, JVET-O0537, 15th Meeting: Gothenburg, SE, Jul. 3-12, 2019, Doc: JVET-O0537, pp. 1-6.

Zhao X., et al., "Six Tap Intra Interpolation Filter," JVET Meeting, (The Joint Video Exploration Team (JVET) of ITU-T SG 16 WP 3 and ISO/IEC JTC 1/SC 29/WG 11), 4th Meeting, Chengdu, CN, Oct. 15-21, 2016, No. JVET-D0119r1, pp. 1-3.

* cited by examiner

VIDEO CODING USING OVERLAPPED BLOCK MOTION COMPENSATION, COMBINED INTER-INTRA PREDICTION, AND/OR LUMA MAPPING AND CHROMA SCALING

This application claims the benefit of U.S. Provisional Application No. 63/197,190, filed Jun. 4, 2021, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding video data using various combinations of overlapped block motion compensation (OBMC), combined inter/intra prediction (CIIP), and luma mapping and chroma scaling (LMCS). This disclosure describes various techniques in which these various coding modes can be combined or excluded depending on which modes are enabled or disabled.

In one example, a method of decoding video data includes generating an inter-prediction block for a current block of video data; generating an intra-prediction block for the current block of video data; generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decoding the current block of video data using the final prediction block.

In another example, a device for decoding video data includes a memory configured to store video data; and one or more processors implemented in circuitry and configured to: generate an inter-prediction block for a current block of the video data; generate an intra-prediction block for the current block of the video data; generate a final prediction block for the current block of the video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of the video data using the final prediction block.

In another example, a computer-readable storage medium has stored thereon instructions that, when executed, cause a processor to generate an inter-prediction block for a current block of video data; generate an intra-prediction block for the current block of video data; generate a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of video data using the final prediction block.

In another example, a device for decoding video data includes means for generating an inter-prediction block for a current block of video data; means for generating an intra-prediction block for the current block of video data; means for generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and means for decoding the current block of video data using the final prediction block.

The details of one or more examples are set forth in the accompanying drawings and the description below. Other features, objects, and advantages will be apparent from the description, drawings, and claims.

DETAILED DESCRIPTION

Figure 1:
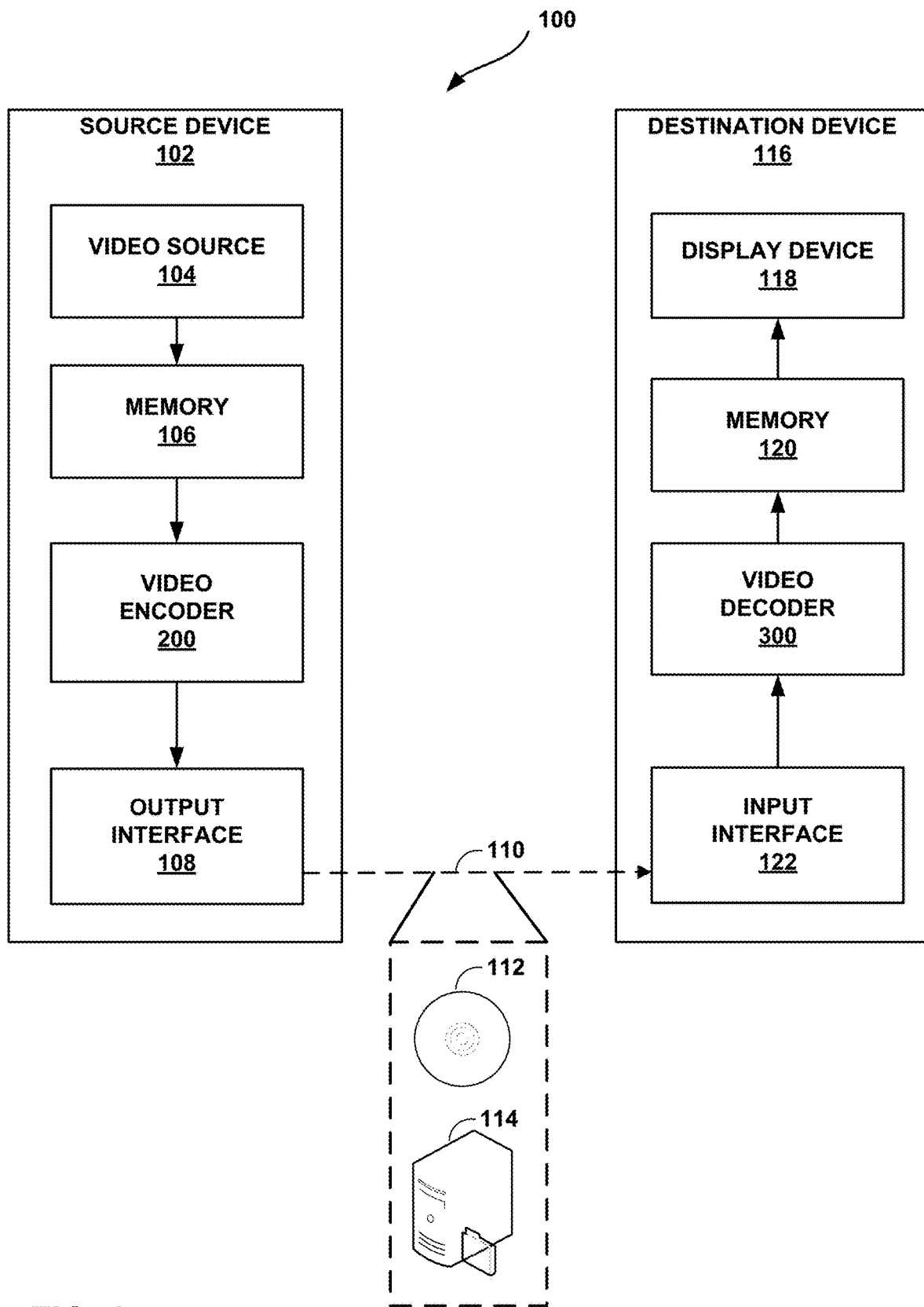
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data using various combinations of overlapped block motion compensation (OBMC), combined inter/intra prediction (CIIP), and luma mapping and chroma scaling (LMCS). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding video data using various combinations of overlapped block motion compensation (OBMC), combined inter/intra prediction (CIIP), and luma mapping and chroma scaling (LMCS). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards.

The techniques of this disclosure, however, are not limited to any particular coding standard or format. In general, video encoder 200 and video decoder 300 may be configured to perform the techniques of this disclosure in conjunction with any video coding techniques that use various combinations of overlapped block motion compensation (OBMC), combined inter/intra prediction (CIIP), and luma mapping and chroma scaling (LMCS).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may code (encode and/or decode) a block of video data using various combinations of OBMC, CIIP, and/or LMCS, as discussed in greater detail below.

Figure 2:
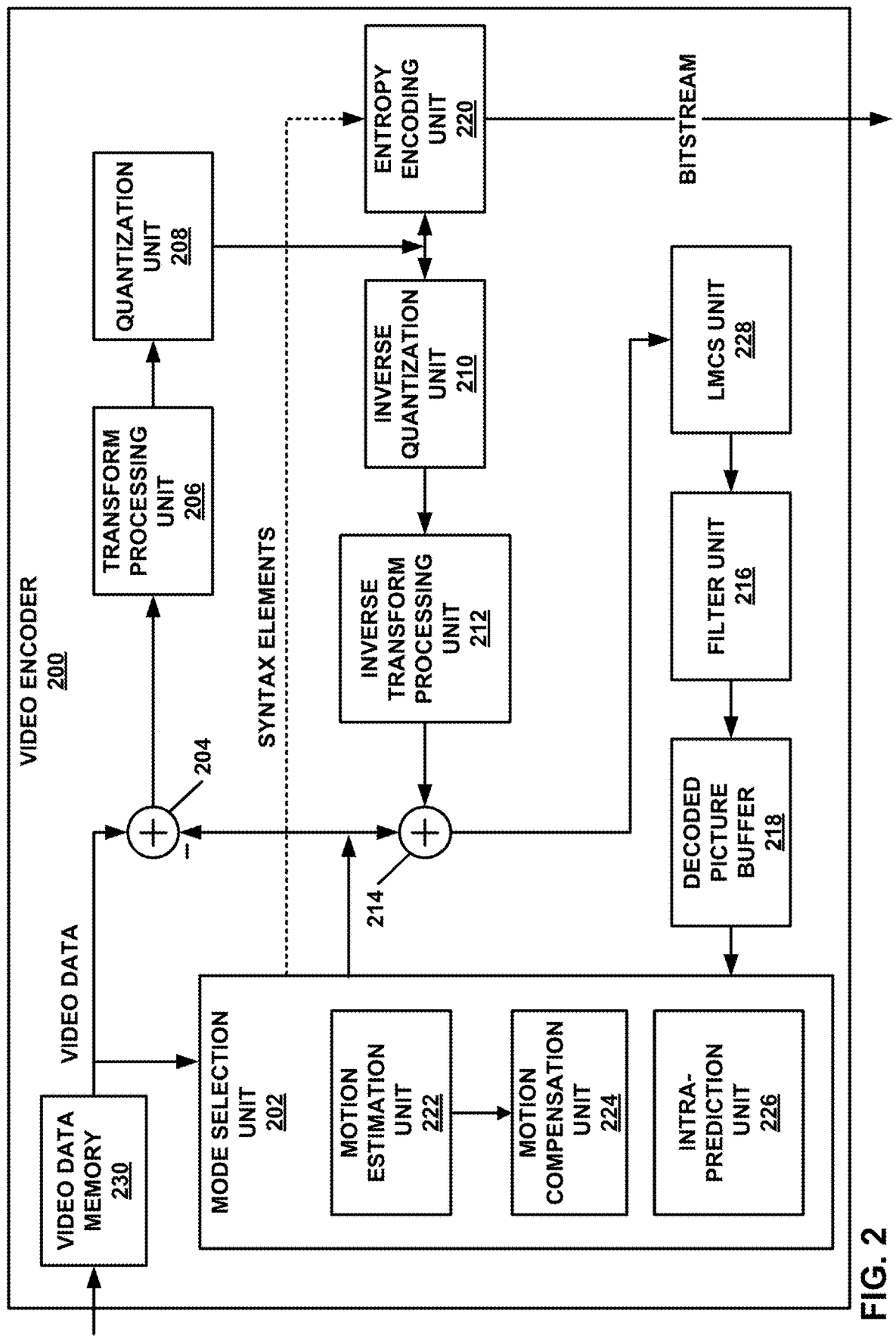
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266) and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, luma mapping with chroma scaling (LMCS) unit 228, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, LMCS unit 228, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

LMCS unit 228 may be configured to perform luma mapping and chroma scaling. Additional details regarding LMCS are discussed below with respect to FIG. 4. In general, LMCS unit 228 may, for luma data, perform in-loop mapping based on adaptive piecewise linear models, and for chroma data, perform luma-dependent chroma residual scaling.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
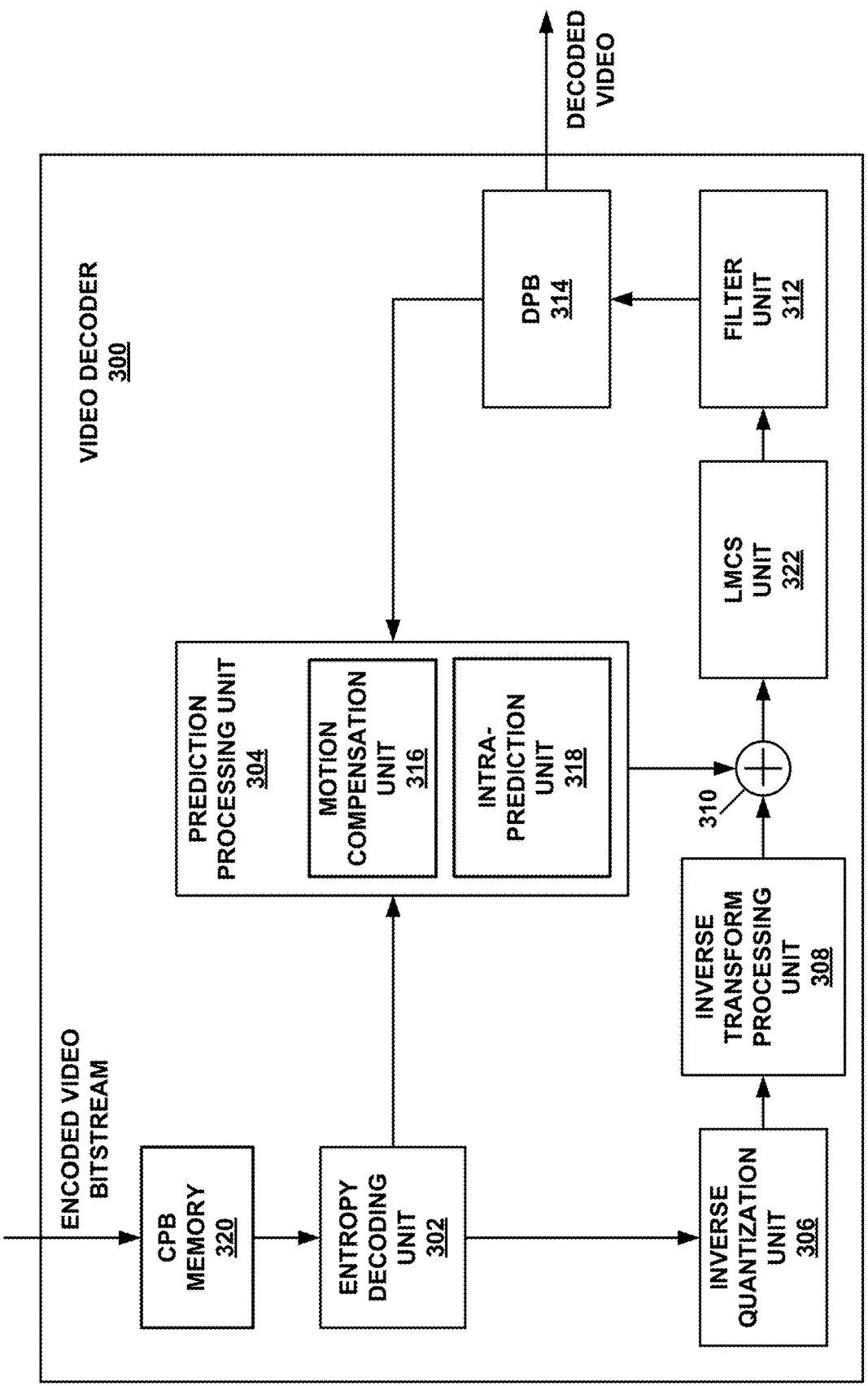
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266) and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, luma mapping with chroma scaling (LMCS) unit 322, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, LMCS unit 322, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

LMCS unit 322 may be configured to perform luma mapping and chroma scaling. Additional details regarding LMCS are discussed below with respect to FIG. 4. In general, LMCS unit 322 may, for luma data, perform in-loop mapping based on adaptive piecewise linear models, and for chroma data, perform luma-dependent chroma residual scaling.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 4:
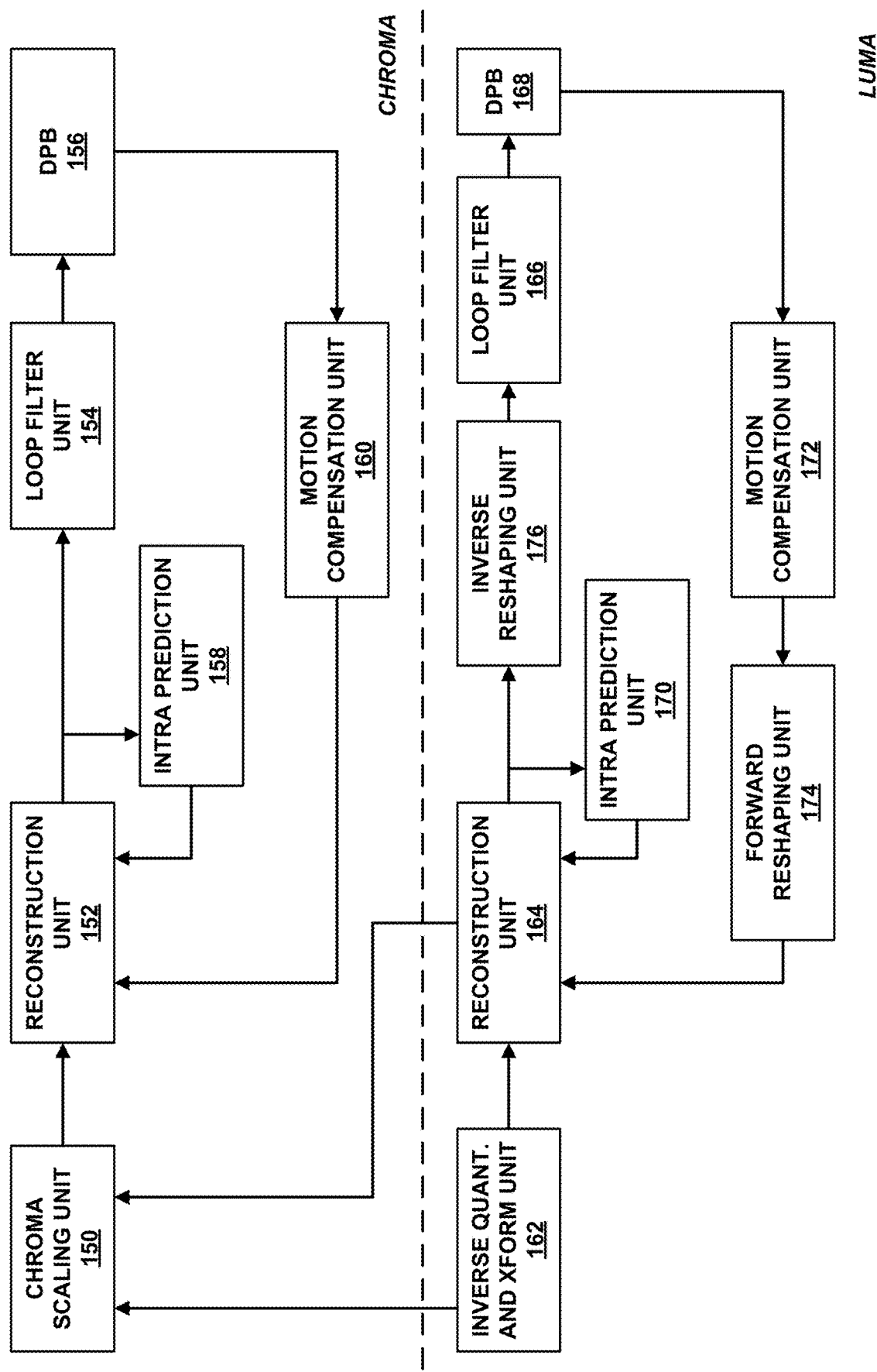
FIG. 4 is a conceptual diagram illustrating an example architecture for performing luma mapping with chroma scaling (LMCS).

FIG. 4 is a conceptual diagram illustrating an example architecture for performing luma mapping with chroma scaling (LMCS). ITU-T H.266/Versatile Video Coding (VVC) includes a luma mapping with chroma scaling (LMCS) technique, which video coders such as video encoder 200 and video decoder 300 may implement as a separate processing block before the loop filters, e.g., filter unit 216 (FIG. 2) or filter unit 312 (FIG. 3).

In the example of FIG. 4, the architecture includes a chroma portion for decoding (i.e., reconstructing) chroma data and a luma portion for decoding luma data. The chroma portion includes chroma scaling unit 150, reconstruction unit 152, loop filter unit 154, DPB 156, intra prediction unit 158, and motion compensation unit 160. The luma portion includes inverse quantization and inverse transform unit 162, reconstruction unit 164, inverse reshaping unit 176, loop filter unit 166, DPB 168, intra prediction unit 170, motion compensation unit 172, and forward reshaping unit 174.

According to VVC, LMCS has two main components: 1) in-loop mapping of the luma component based on adaptive piecewise linear models; 2) for the chroma components, luma-dependent chroma residual scaling is applied. FIG. 4 shows the LMCS architecture from the perspective of a video decoder, such as video decoder 300. Thus, video decoder 300 may further include an LMCS unit between reconstruction unit 310 and filter unit 312. As shown in the example of FIG. 3, for example, video decoder 300 includes LMCS unit 322, which may correspond to chroma scaling unit 150, inverse shaping unit 176, and forward reshaping unit 174. Similarly, video encoder 200 in the example of FIG. 2 includes LMCS unit 228, which may correspond to chroma scaling unit 150, inverse shaping unit 176, and forward reshaping unit 174 of FIG. 4.

Inverse quantization and inverse transform (xform) unit 162 may correspond to inverse quantization unit 210 and inverse transform processing unit 212 (FIG. 2) or inverse quantization unit 306 and inverse transform processing unit 308 (FIG. 3). Reconstruction units 152 and 1654 of FIG. 4 may correspond to reconstruction unit 214 (FIG. 2) or reconstruction unit 310 (FIG. 3). Intra-prediction units 158, 170 of FIG. 4 may correspond to intra-prediction unit 226 (FIG. 2) or intra-prediction unit 318 (FIG. 3). Inverse quantization and transform unit 162, reconstruction unit 164, and intra-prediction unit 170 of FIG. 4 may perform processing in a mapped domain.

Other units in FIG. 4 may perform processing in the original (i.e., non-mapped) domain. Such units include loop filter units 154, 166 (such as deblocking, ALF, and SAO), motion compensation units 160, 172, chroma intra prediction unit 158, reconstruction unit 152, and DPBs 156, 168 that store decoded pictures as reference pictures. Chroma scaling unit 150, forward reshaping unit 174, and inverse reshaping unit 176 of FIG. 4 correspond to LMCS functional blocks. Like most other tools in VVC, LMCS can be enabled/disabled at the sequence level using an SPS flag.

Forward reshaping unit 174 may perform in-loop mapping of the luma component to adjust the dynamic range of the input signal, including redistributing the codewords across the dynamic range to improve compression efficiency. Luma mapping performed by forward reshaping unit 174 may make use of a forward mapping function, FwdMap. Inverse reshaping unit 176 may execute a corresponding inverse mapping function, InvMap.

As shown in FIG. 4, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}=FwdMap(Y_{pred})$. For an intra-coded block, the FwdMap function is not applied because intra prediction is performed in the mapped domain. After reconstructed block $Y_r$ is calculated, inverse reshaping unit 176 may execute the InvMap function to convert the reconstructed luma values in the mapped domain back to the reconstructed luma values in the original domain ($\hat{Y}_i=InvMap(Y_r)$). The InvMap function may be applied to both intra- and inter-coded luma blocks.

Figure 5B:
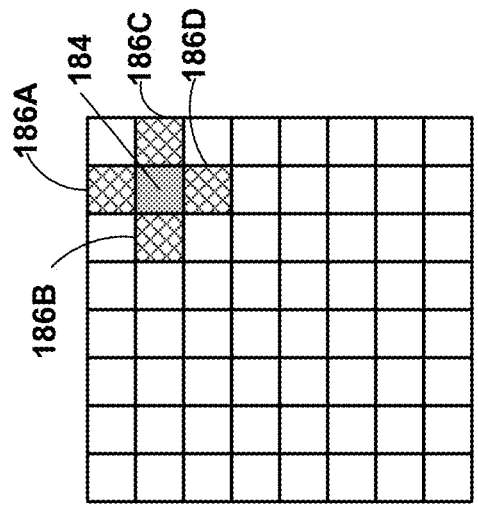
FIGS. 5A and 5B are conceptual diagrams illustrating examples of sub-blocks used in overlapped block motion compensation (OBMC).
Figure 5A:
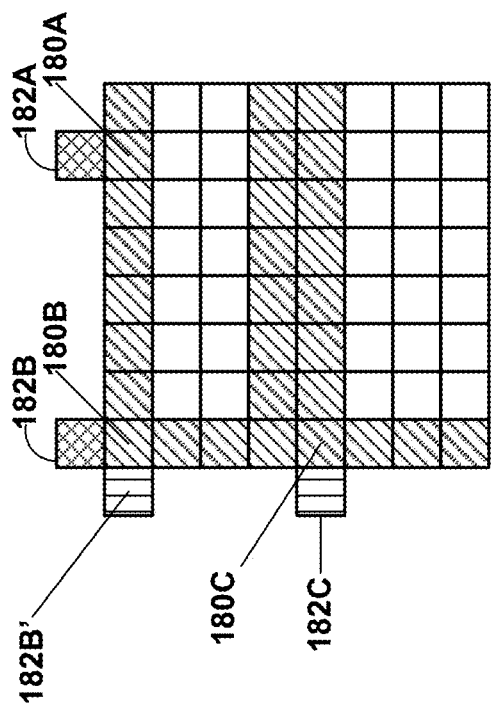

FIGS. 5A and 5B are conceptual diagrams illustrating examples of sub-blocks used in overlapped block motion compensation (OBMC). In particular, the example of FIG. 5A depicts an example block (e.g., a current CU) including sub-blocks (i.e., blocks shaded with left-to-right downward hashing) at CU or PU boundaries thereof to which OBMC applies. In the example of FIG. 5A, motion vectors of sub-blocks 182B and 182B' are used to perform OBMC of sub-block 180B; and a motion vector of sub-block 182C is used to perform OBMC of sub-block 180C.

FIG. 5B depicts an example block (e.g., a CU) including sub-PUs to which OBMC applies in advanced temporal motion vector prediction (ATMVP) mode. In the example of FIG. 5B, motion vectors of neighboring sub-blocks 186A-186D (neighboring sub-blocks 186) are used to perform OBMC of sub-block 184.

In some examples, OBMC can be switched on and off using syntax elements (e.g., flags) coded at the CU level. When OBMC is used in a CU, OBMC may be performed for all motion compensation (MC) block boundaries except the right and bottom boundaries of the CU. Moreover, OBMC may be applied for both the luma and chroma components. In some video codecs, a MC block corresponds to a coding block. When a CU is coded with sub-CU mode (e.g., includes sub-CU merge, affine, and Frame Rate Up Conversion (FRUC) mode), each sub-block of the CU may be a MC block. To process CU boundaries in a uniform fashion, OBMC may be performed at the sub-block level for all MC block boundaries, where the sub-block size may be set equal to 4×4, as illustrated in FIGS. 5A and 5B.

When OBMC applies to the current sub-block, besides current motion vectors, motion vectors of four connected neighboring sub-blocks, if available and not identical to the current motion vector, may also be used to derive a prediction block for the current sub-block. These multiple prediction blocks based on multiple motion vectors may be combined to generate the final prediction signal of the current sub-block.

A prediction block based on motion vectors of a neighboring sub-block may be denoted as $P_N$, with N indicating an index for the neighboring above, below, left and right sub-blocks and prediction block based on motion vectors of the current sub-block is denoted as $P_C$. When $P_N$ is based on the motion information of a neighboring sub-block that contains the same motion information to the current sub-block, the OBMC may not be performed from $P_N$. Otherwise, every sample of $P_N$ may be added to the same sample in $P_C$, i.e., four rows/columns of $P_N$ are added to $P_C$. The weighting factors {¼, ⅛, ¹⁄₁₆, ¹⁄₃₂} may be used for $P_N$, and the weighting factors {¾, ⅞, ¹⁵⁄₁₆, ³¹⁄₃₂} may be used for $P_C$. The exception are small MC blocks, (e.g., when height or width of the coding block is equal to 4 or a CU is coded with sub-CU mode), for which only two rows/columns of $P_N$ are added to $P_C$. In this case, weighting factors {¼, ⅛} are used for $P_N$ and weighting factors {¾, ⅞} may be used for $P_C$. For $P_N$ generated based on motion vectors of vertically (horizontally) neighboring sub-block, samples in the same row (column) of $P_N$ may be added to $P_C$ with a same weighting factor.

In ITU-T H.266/Versatile Video Coding (VVC), a CU may be coded using combined inter/intra prediction (CIIP) mode. As its name indicates, the CIIP prediction combines an inter prediction signal with an intra prediction signal to form a final prediction signal. The intra and inter prediction signals may be combined using weighted averaging as follows:

$$P_{CIIP}=(1-wt)*P_{inter}+wt*P_{intra}.$$

As described above, a video coder performing CIIP mode generates a final predictor through calculating a weighted average of an inter prediction block and an intra prediction block. In the presence of LMCS, the inter predictor is in the original domain, while the intra predictor is in the mapped domain. Therefore, in VVC, the luma mapping is performed on the inter predictor to map the inter predictor into the mapped domain before weighted averaging with the intra predictor. When OBMC is to be applied to the CIIP coded block, the interaction with LMCS is not yet defined.

This disclosure describes various techniques for combining the techniques of OBMC, LMCS, and CIIP. Although the specific examples of OBMC, LMCS, and CIIP are described, these techniques may be applied to other coding techniques as well. For example, these techniques may be applied for OBMC variants that use different on/off control, weighting parameters, and/or other adaptation techniques. As another example, these techniques may be applied for LMCS variants that use different mapping techniques. As yet another example, these techniques may be applied for CIIP variants that use different weight calculation methods or other adaptation techniques. In general, the methods of this disclosure apply to a coding tool that use at least one intra predictor and one inter predictor, and one inter predictor that uses the motion information from a neighboring coded block.

In some examples, a CIIP flag may be signaled in the bitstream prior to an OBMC flag. In one example, OBMC is disabled for CIIP. Specifically, when a video coder (such as video encoder 200 or video decoder 300) determines that a current block is coded using CIIP mode, the video coder does not code an OBMC flag and infers the OBMC flag to be false (i.e., that OBMC is not used). In some examples, the video coder disables OBMC for a CIIP coded block if LMCS is applied. When LMCS is applied and a current block uses CIIP mode, the video coder does not code an OBMC flag and infers the OBMC flag to be false.

In some examples, the video coder codes a CU-level flag that indicates the use of LMCS for a current block, where the LMCS CU-level flag is coded after CIIP and OBMC flags. The video coder may infer that the LMCS CU-level flag is false without explicitly coding the LMCS CU-level flag when OBMC and CIIP are both applied to a current block, no matter whether the CIIP flag is indicated prior to the OBMC flag or not.

In some examples, an OBMC flag may be signaled in the bitstream prior to the CIIP flag. In one example, a video coder disables CIIP mode for OBMC. Specifically, when a current block is coded using OBMC mode, the video coder does not code a value for the CIIP flag and infers that the CIIP flag is false. In some examples, a video coder disables CIIP for an OBMC coded block if LMCS is applied. When LMCS is applied and the current block is coded using OBMC mode, the video coder may not code the CIIP flag and infer that the CIIP flag is false.

Figure 6:
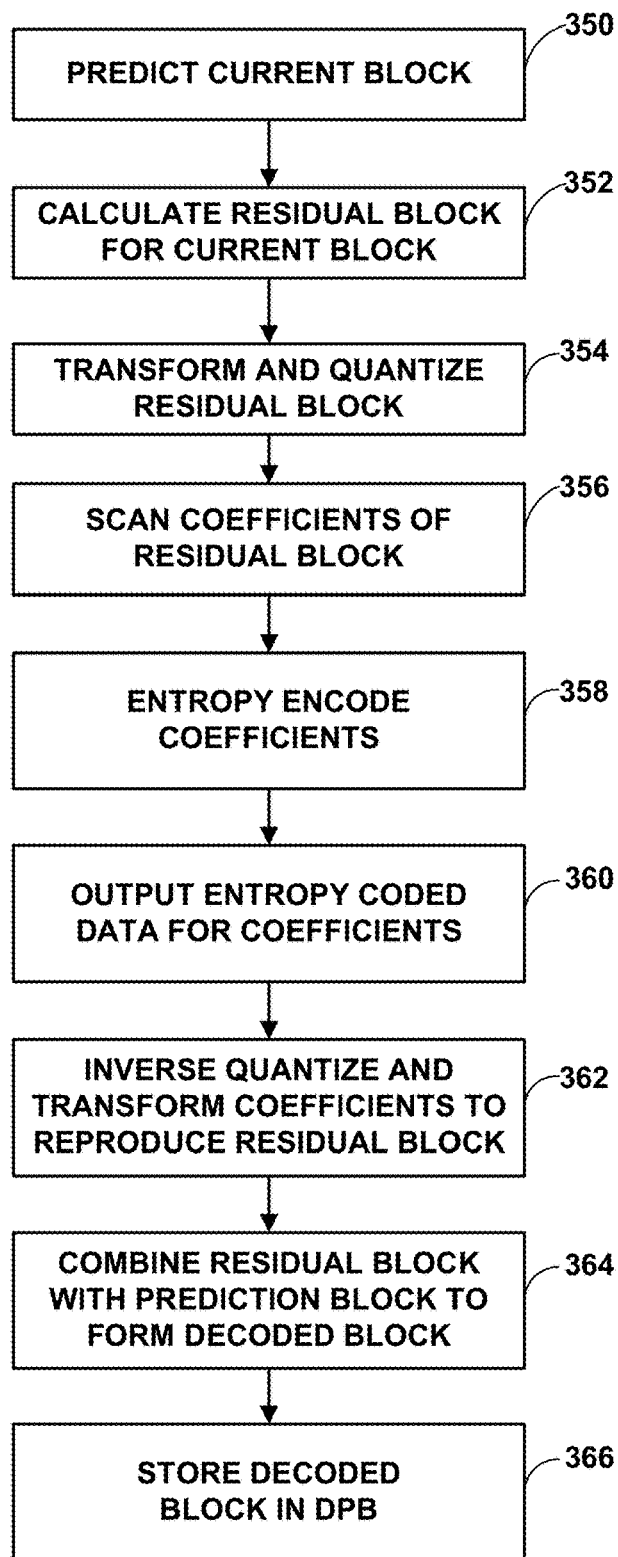
FIG. 6 is a flowchart illustrating an example method for encoding a current block in accordance with the techniques of this disclosure.

FIG. 6 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 6.

In this example, video encoder 200 initially predicts the current block (350). For example, video encoder 200 may form a prediction block for the current block. Video encoder 200 may use any of the various techniques of this disclosure to predict the block, e.g., using various combinations of OBMC, CIIP, and/or LMCS, such as the techniques discussed above or the techniques described below with respect to FIGS. 8-10. In particular, video encoder 200 may generate an inter-prediction block and an intra-prediction block for the current block. Video encoder 200 may then generate a final prediction block from the inter-prediction block and the intra-prediction block, including performing a combination of OBMC, CIIP, and LMCS when generating the final prediction block.

Video encoder 200 may then calculate a residual block for the current block (352). To calculate the residual block, video encoder 200 may calculate a difference between the original, uncoded block and the prediction block (i.e., the final prediction block) for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

In this manner, the method of FIG. 6 represents an example of a method of encoding and decoding video data, including generating an inter-prediction block for a current block of video data; generating an intra-prediction block for the current block of video data; generating a final prediction block for the current block of video data from the inter-prediction block and the intra-prediction block, including performing each of combined inter/intra prediction (CIIP)

mode, overlapped block motion compensation (OBMC), and luma mapping with chroma scaling (LMCS) while generating the final prediction block; and decoding the current block of video data using the final prediction block.

Figure 7:
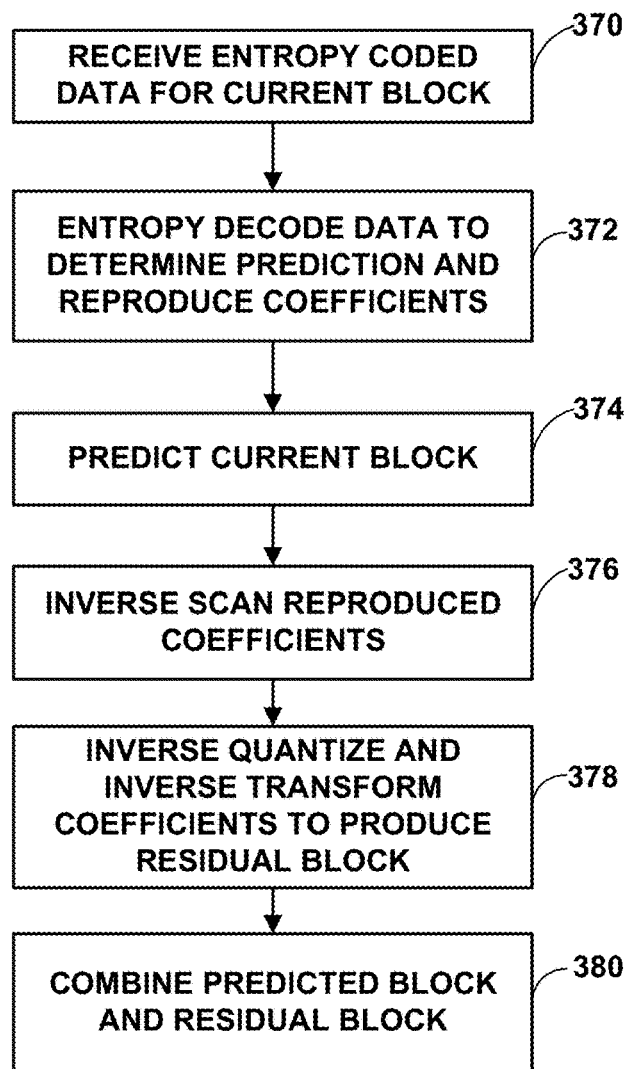
FIG. 7 is a flowchart illustrating an example method for decoding a current block in accordance with the techniques of this disclosure.

FIG. 7 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 7.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may use any of the various techniques of this disclosure to predict the block, e.g., using various combinations of OBMC, CIIP, and/or LMCS, such as the techniques discussed above or the techniques described below with respect to FIGS. 8-10. In particular, video decoder 300 may generate an inter-prediction block and an intra-prediction block for the current block. Video decoder 300 may then generate a final prediction block from the inter-prediction block and the intra-prediction block, including performing a combination of OBMC, CIIP, and LMCS when generating the final prediction block.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

In this manner, the methods of FIGS. 6 and 7 represent examples of a method including determining that a current block of video data is coded using combined inter/intra prediction (CIIP) mode; in response to determining that the current block is coded using CIIP mode, preventing coding of overlapped block motion compensation (OBMC) information for the current block; and decoding the current block using CIIP mode.

The methods of FIGS. 6 and 7 also represent examples of a method including determining that a current block of video data is coded using combined inter/intra prediction (CIIP) mode and using overlapped block motion compensation (OBMC), the current block comprising at least a portion of a coding unit (CU) of the video data; in response to determining that the current block is coded using CIIP mode and OBMC, determining that luma mapping with chroma scaling (LMCS) is not to be applied to the current block; and decoding the current block using CIIP mode and OBMC, without applying LMCS to the current block.

The methods of FIGS. 6 and 7 also represent examples of a method including determining that a current block of video data is coded using overlapped block motion compensation (OBMC); in response to determining that the current block is coded using OBMC, preventing coding of combined inter/intra prediction (CIIP) mode information for the current block; and decoding the current block using OBMC mode.

Figure 8:
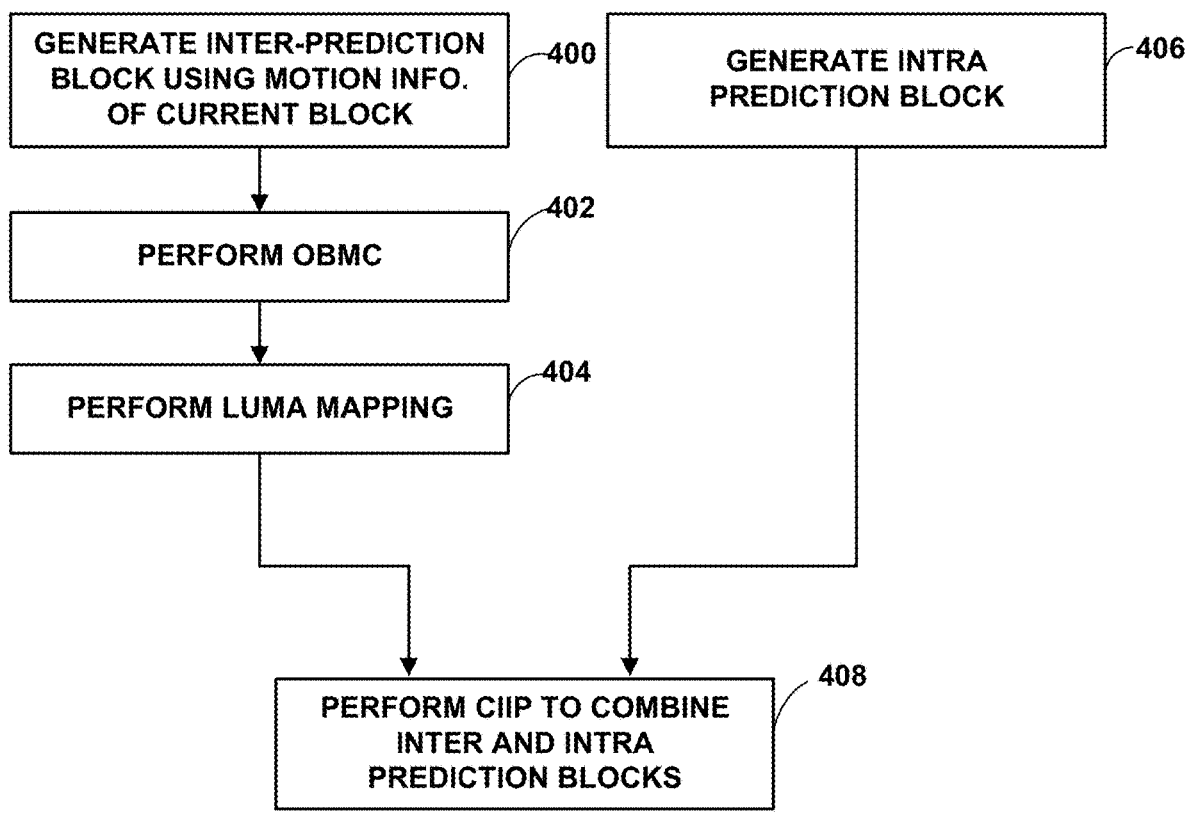
FIG. 8 is a flowchart illustrating an example method of predicting a block of video data using OBMC and CIIP together.

The methods of FIGS. 6 and 7 also represent examples of a method including determining that a current block of video data is coded using combined inter/intra prediction (CIIP) mode; generating an inter-prediction block for the current block using overlapped block motion compensation (OBMC); generating an intra-prediction block for the current block; generating a prediction block for the current block using the inter-prediction block and the intra-prediction block; and decoding the current block using the prediction block (e.g., including the method of FIG. 8 as discussed in greater detail below).

Figure 9:
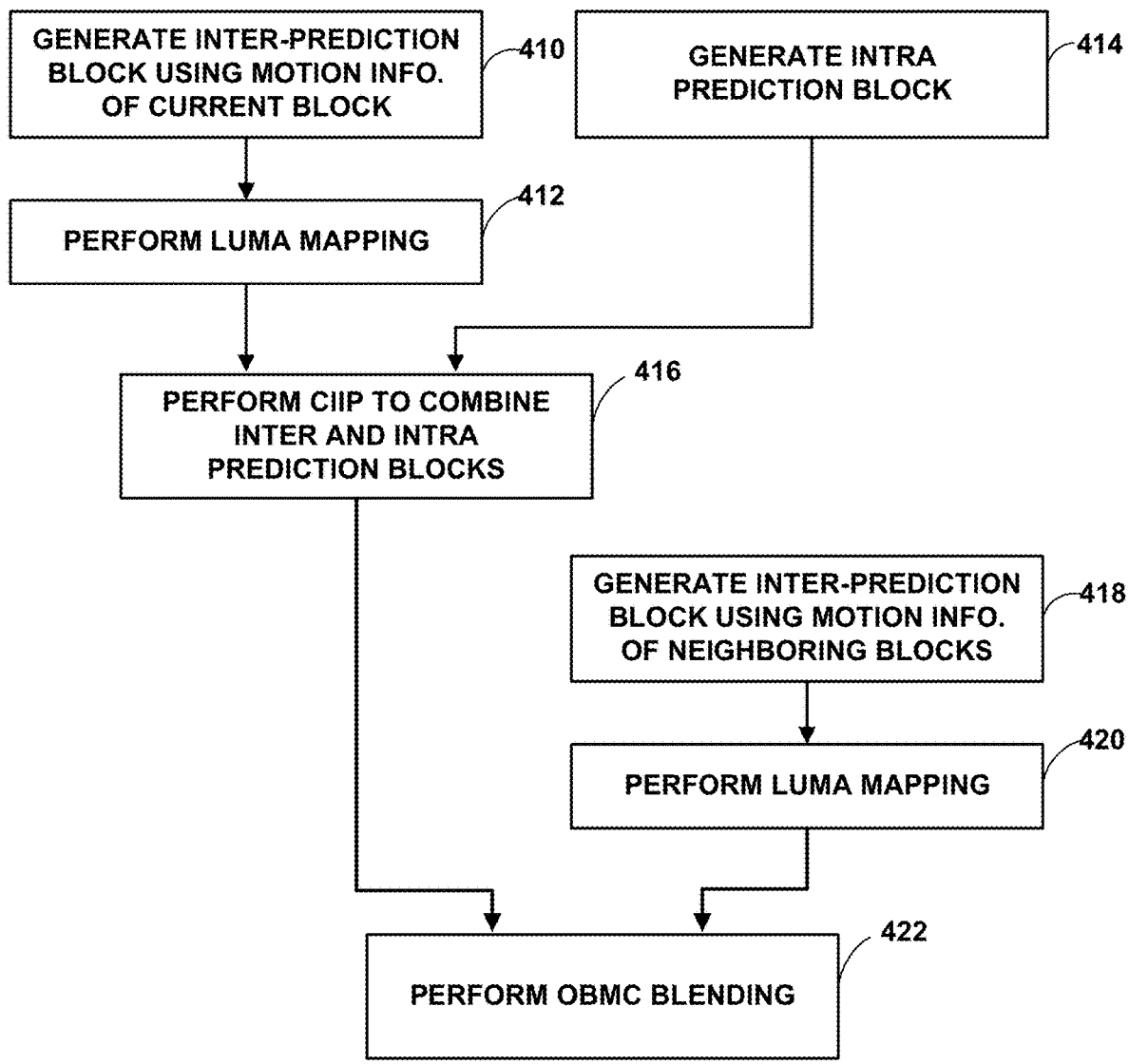
FIG. 9 is a flowchart illustrating an example method of predicting a block of video data using CIIP, OBMC, and LMCS together.

The methods of FIGS. 6 and 7 also represent examples of a method including determining that a current block of video data is coded using combined inter/intra prediction (CIIP) mode, overlapped block motion compensation (OBMC), and luma mapping with chroma scaling (LMCS); generating an intermediate inter-prediction block for the current block using motion information of the current block; performing luma mapping on the intermediate inter-prediction block according to LMCS to form a final inter-prediction block for the current block; generating an intra-prediction block for the current block; performing CIIP to combine the final inter-prediction block with the intra-prediction block to form a first prediction block for the current block; generating one or more other intermediate prediction blocks for the current block using motion information of one or more neighboring blocks to the current block; performing luma mapping on the one or more other intermediate prediction blocks according to LMCS to form one or more other prediction blocks for the current block; generating a final prediction block for the current block using the first prediction block and the one or more other prediction blocks according to OBMC; and decoding the current block using the final prediction block (e.g., including the method of FIG. 9 as discussed in greater detail below).

Figure 10:
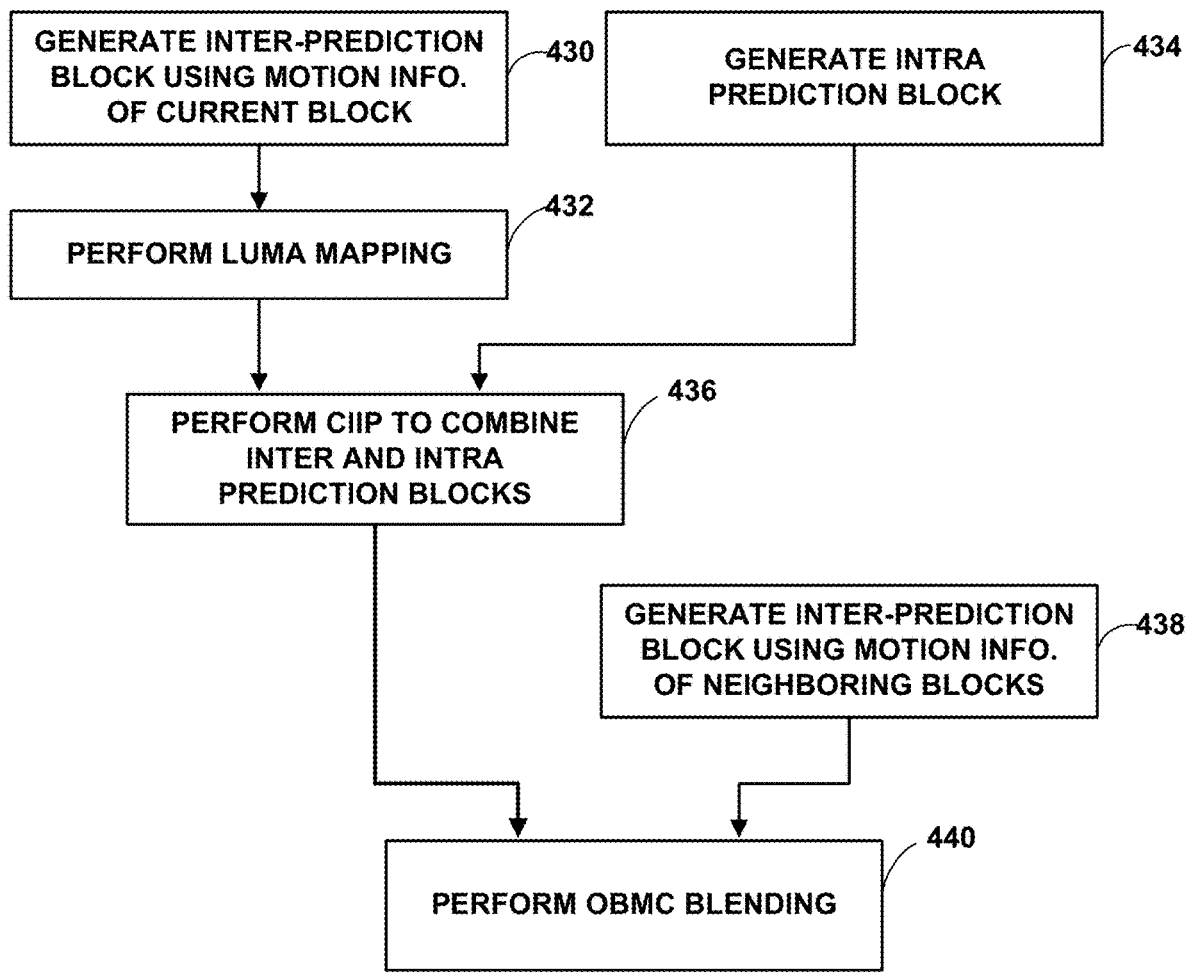
FIG. 10 is a flowchart illustrating another example method of predicting a block of video data using CIIP, OBMC, and LMCS together.

The methods of FIGS. 6 and 7 also represent examples of a method including determining that a current block of video data is coded using combined inter/intra prediction (CIIP) mode, overlapped block motion compensation (OBMC), and luma mapping with chroma scaling (LMCS); generating an intermediate inter-prediction block for the current block using motion information of the current block; performing luma mapping on the intermediate inter-prediction block according to LMCS to form a final inter-prediction block for the current block; generating an intra-prediction block for the current block; performing CIIP to combine the final inter-prediction block with the intra-prediction block to form a first prediction block for the current block; generating one or more other prediction blocks for the current block using motion information of one or more neighboring blocks to the current block; generating a final prediction block for the current block using the first prediction block and the one or more other prediction blocks according to OBMC; and decoding the current block using the final prediction block (e.g., including the method of FIG. 10 as discussed in greater detail below).

The method of FIG. 7 further represents an example of a method of decoding video data, including generating an inter-prediction block for a current block of video data; generating an intra-prediction block for the current block of video data; generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decoding the current block of video data using the final prediction block.

FIG. 8 is a flowchart illustrating an example method of predicting a block of video data using OBMC and CIIP together. Video encoder 200 or video decoder 300 may be configured to perform this method when predicting a block of video data. The method of FIG. 8 is discussed with respect to video decoder 300 specifically, although it should be understood that video encoder 200 may perform this or a similar method as well. The method of FIG. 8 may be performed during prediction of a block of video data, e.g., during step 350 of the method of FIG. 6 or step 374 of the method of FIG. 7.

In this example, video decoder 300 may initially generate an inter-prediction block using motion information of a current block of video data (400). Video decoder 300 may then apply OBMC to the inter-prediction block to generate an OBMC inter prediction block (402). Video decoder 300 may then perform luma mapping with chroma scaling (LMCS) to the OBMC inter-prediction block to form an LMCS inter-prediction block (404). Video decoder 300 may also generate an intra-prediction block (406). Video decoder 300 may perform CIIP to combine the LMCS inter-prediction block with the intra-prediction block (408).

In other words, video decoder 300 may generate a final prediction block as a CIIP block (i.e., the inter-prediction block for CIIP block is updated with OBMC) and then video decoder 300 may apply luma mapping, if LMCS is present, to the OBMC-updated luma inter-prediction block before performing weighted averaging with the intra-prediction block.

In this manner, the method of FIG. 8 represents an example of a method of decoding or encoding a block of video data including performing OBMC on an inter-prediction block to form an OBMC compensated inter-prediction block; performing LMCS on the OBMC compensated inter-prediction block to form an LMCS mapped inter-prediction block; and combining the LMCS mapped inter-prediction block with an intra-prediction block using CIIP mode to generate the final prediction block.

FIG. 9 is a flowchart illustrating an example method of predicting a block of video data using CIIP, OBMC, and LMCS together. Video encoder 200 or video decoder 300 may be configured to perform this method when predicting a block of video data. The method of FIG. 9 is discussed with respect to video decoder 300 specifically, although it should be understood that video encoder 200 may perform this or a similar method as well. The method of FIG. 9 may be performed during prediction of a block of video data, e.g., during step 350 of the method of FIG. 6 or step 374 of the method of FIG. 7.

In the example of FIG. 9, video decoder 300 applies the blending process of OBMC on top of the combined inter and intra prediction signal of CIIP. In general, video decoder 300 first generates a combined an inter and intra prediction signal, denoted as $P_C$, using the motion information and the intra prediction information of current block. That is, video decoder 300 first generates an inter-prediction block using motion information of a current block (410). Video decoder 300 then performs luma mapping with chroma scaling on the inter-prediction block (412). Video decoder 300 also generates an intra-prediction block (414). Video decoder 300 performs CIIP to combine the LMCS inter-prediction block with the intra-prediction block (416), where the CIIP-combined block is referred to as $P_C$.

Then, video decoder 300 generates one or more other prediction blocks, denoted as $P_N$, based on motion information of neighboring sub-blocks (418). Video decoder 300 may then apply luma mapping, if LMCS is present, to the prediction blocks $P_N$ (420). Finally, video decoder 300 may perform the OBMC blending process to combine $P_N$ and $P_C$ (422).

In this manner, the method of FIG. 9 represents an example method for decoding or encoding video data including performing LMCS on a first inter-prediction sub-block to form an LMCS mapped first inter-prediction sub-block; combining the LMCS mapped first inter-prediction sub-block with an intra-prediction block using CIIP mode to generate a first CIIP prediction sub-block for the current block; performing LMCS on a second inter-prediction sub-block; and performing OBMC blending between the first CIIP prediction sub-block and the second inter-prediction sub-block to generate the final prediction block.

FIG. 10 is a flowchart illustrating another example method of predicting a block of video data using CIIP, OBMC, and LMCS together. Video encoder 200 or video decoder 300 may be configured to perform this method when predicting a block of video data. The method of FIG. 10 is discussed with respect to video decoder 300 specifically, although it should be understood that video encoder 200 may perform this or a similar method as well. The method of FIG. 10 may be performed during prediction of a block of video data, e.g., during step 350 of the method of FIG. 6 or step 374 of the method of FIG. 7.

In general, in the example of FIG. 10, like with the example of FIG. 9, video decoder 300 applies the blending process of OBMC on top of the combined inter and intra prediction signal. However, in this example, the luma mapping is not performed on top of the prediction blocks that are generated using the motion information of neighboring blocks.

In particular, in the example of FIG. 10, video decoder 300 first generates an inter-prediction block using motion information of a current block (430). Video decoder 300 then performs luma mapping with chroma scaling on the inter-prediction block (432). Video decoder 300 also generates an intra-prediction block (434). Video decoder 300 performs CIIP to combine the LMCS inter-prediction block with the intra-prediction block (436), where the CIIP-combined block is referred to as $P_C$.

Then, video decoder 300 generates one or more other prediction blocks, denoted as $P_N$, based on motion information of neighboring sub-blocks (438). Finally, video decoder 300 may perform the OBMC blending process to combine $P_N$ and $P_C$ (440).

In this manner, the method of FIG. 10 represents an example method for decoding or encoding video data including performing LMCS on a first inter-prediction sub-block to form an LMCS mapped first inter-prediction sub-block; combining the LMCS mapped first inter-prediction sub-block with an intra-prediction block using CIIP mode to generate a first CIIP prediction sub-block for the current block; and performing OBMC blending between the first CIIP prediction sub-block and a second inter-prediction sub-block to generate the final prediction block.

The following clauses represent certain example techniques of this disclosure:

Clause 1: A method of decoding video data, the method comprising: determining that a current block of video data is coded using combined inter/intra prediction (CIIP) mode; in response to determining that the current block is coded using CIIP mode, preventing coding of overlapped block motion compensation (OBMC) information for the current block; and decoding the current block using CIIP mode.

Clause 2: The method of clause 1, further comprising inferring that OBMC is not applied to the current block, and wherein decoding the current block comprises decoding the current block without performing OBMC.

Clause 3: The method of any of clauses 1 and 2, further comprising determining that luma mapping with chroma scaling (LMCS) is to be applied to the current block, wherein determining that the OBMC information is not signaled comprises determining that the OBMC information is not signaled in response to determining that the current block is coded using CIIP mode and that LMCS is to be applied to the current block.

Clause 4: A method of decoding video data, the method comprising: determining that a current block of video data is coded using combined inter/intra prediction (CIIP) mode and using overlapped block motion compensation (OBMC), the current block comprising at least a portion of a coding unit (CU) of the video data; in response to determining that the current block is coded using CIIP mode and OBMC, determining that luma mapping with chroma scaling (LMCS) is not to be applied to the current block; and decoding the current block using CIIP mode and OBMC, without applying LMCS to the current block.

Clause 5: The method of clause 4, wherein determining that LMCS is not to be applied to the current block comprises determining that a LMCS flag is not signaled in the CU and inferring a value of false for the LMCS flag, the LMCS flag indicating whether LMCS is to be applied to blocks of the CU.

Clause 6: The method of any of clauses 4 and 5, further comprising: coding a CIIP flag having a value indicating that CIIP mode is to be applied to the current block; and coding an OBMC flag having a value indicating that OBMC is to be applied to the current block.

Clause 7: The method of any of clauses 4-6, further comprising avoiding coding of any LMCS information for the current block.

Clause 8: A method of decoding video data, the method comprising: determining that a current block of video data is coded using overlapped block motion compensation (OBMC); in response to determining that the current block is coded using OBMC, preventing coding of combined inter/intra prediction (CIIP) mode information for the current block; and decoding the current block using OBMC mode.

Clause 9: The method of clause 8, further comprising inferring that CIIP mode is not applied to the current block, and wherein decoding the current block comprises decoding the current block without performing CIIP mode.

Clause 10: The method of any of clauses 8 and 9, further comprising determining that luma mapping with chroma scaling (LMCS) is to be applied to the current block, wherein determining that the CIIP mode information is not signaled comprises determining that the CIIP mode information is not signaled in response to determining that the current block is coded using OBMC and that LMCS is to be applied to the current block.

Clause 11: A method of decoding video data, the method comprising: determining that a current block of video data is coded using combined inter/intra prediction (CIIP) mode; generating an inter-prediction block for the current block using overlapped block motion compensation (OBMC); generating an intra-prediction block for the current block; generating a prediction block for the current block using the inter-prediction block and the intra-prediction block; and decoding the current block using the prediction block.

Clause 12: The method of clause 11, wherein the inter-prediction block comprises an intermediate inter-prediction block, the method further comprising performing luma mapping on the intermediate inter-prediction block according to luma mapping with chroma scaling (LMCS) to form a final inter-prediction block, and wherein generating the prediction block comprises generating the prediction block using the final inter-prediction block and the intra-prediction block.

Clause 13: A method of decoding video data, the method comprising: determining that a current block of video data is coded using combined inter/intra prediction (CIIP) mode, overlapped block motion compensation (OBMC), and luma mapping with chroma scaling (LMCS); generating an intermediate inter-prediction block for the current block using motion information of the current block; performing luma mapping on the intermediate inter-prediction block according to LMCS to form a final inter-prediction block for the current block; generating an intra-prediction block for the current block; performing CIIP to combine the final inter-prediction block with the intra-prediction block to form a first prediction block for the current block; generating one or more other intermediate prediction blocks for the current block using motion information of one or more neighboring blocks to the current block; performing luma mapping on the one or more other intermediate prediction blocks according to LMCS to form one or more other prediction blocks for the current block; generating a final prediction block for the current block using the first prediction block and the one or more other prediction blocks according to OBMC; and decoding the current block using the final prediction block.

Clause 14: A method of decoding video data, the method comprising: determining that a current block of video data is coded using combined inter/intra prediction (CIIP) mode, overlapped block motion compensation (OBMC), and luma mapping with chroma scaling (LMCS); generating an intermediate inter-prediction block for the current block using motion information of the current block; performing luma mapping on the intermediate inter-prediction block according to LMCS to form a final inter-prediction block for the current block; generating an intra-prediction block for the current block; performing CIIP to combine the final inter-prediction block with the intra-prediction block to form a first prediction block for the current block; generating one or more other prediction blocks for the current block using motion information of one or more neighboring blocks to the current block; generating a final prediction block for the current block using the first prediction block and the one or more other prediction blocks according to OBMC; and decoding the current block using the final prediction block.

Clause 15: The method of any of clauses 1-14, further comprising encoding the current block prior to decoding the current block.

Clause 16: A device for decoding video data, the device comprising one or more means for performing the method of any of clauses 1-15.

Clause 17: The device of clause 16, wherein the one or more means comprise one or more processors implemented in circuitry.

Clause 18: The device of any of clauses 16 and 17, further comprising a display configured to display the decoded video data.

Clause 19: The device of any of clauses 16-18, wherein the device comprises one or more of a camera, a computer, a mobile device, a broadcast receiver device, or a set-top box.

Clause 20: The device of clause 16-19, further comprising a memory configured to store the video data.

Clause 21: A computer-readable storage medium having stored thereon instructions that, when executed, cause a processor of a device for decoding video data to perform the method of any of clauses 1-15.

Clause 22: A device for decoding video data, the device comprising: means for determining that a current block of video data is coded using combined inter/intra prediction (CIIP) mode; means for preventing coding of overlapped block motion compensation (OBMC) information for the current block in response to determining that the current block is coded using CIIP mode; and decoding the current block using CIIP mode.

Clause 23: A device for decoding video data, the device comprising: means for determining that a current block of video data is coded using combined inter/intra prediction (CIIP) mode and using overlapped block motion compensation (OBMC), the current block comprising at least a portion of a coding unit (CU) of the video data; means for determining that luma mapping with chroma scaling (LMCS) is not to be applied to the current block in response to determining that the current block is coded using CIIP mode and OBMC; and means for decoding the current block using CIIP mode and OBMC, without applying LMCS to the current block.

Clause 24: A device for decoding video data, the device comprising: means for determining that a current block of video data is coded using overlapped block motion compensation (OBMC); means for preventing coding of combined inter/intra prediction (CIIP) mode information for the current block in response to determining that the current block is coded using OBMC; and means for decoding the current block using OBMC mode.

Clause 25: A device for decoding video data, the device comprising: means for determining that a current block of video data is coded using combined inter/intra prediction (CIIP) mode; means for generating an inter-prediction block for the current block using overlapped block motion compensation (OBMC); means for generating an intra-prediction block for the current block; means for generating a prediction block for the current block using the inter-prediction block and the intra-prediction block; and means for decoding the current block using the prediction block.

Clause 26: A device for decoding video data, the device comprising: means for determining that a current block of video data is coded using combined inter/intra prediction (CIIP) mode, overlapped block motion compensation (OBMC), and luma mapping with chroma scaling (LMCS); means for generating an intermediate inter-prediction block for the current block using motion information of the current block; means for performing luma mapping on the intermediate inter-prediction block according to LMCS to form a final inter-prediction block for the current block; means for generating an intra-prediction block for the current block; means for performing CIIP to combine the final inter-prediction block with the intra-prediction block to form a first prediction block for the current block; means for generating one or more other intermediate prediction blocks for the current block using motion information of one or more neighboring blocks to the current block; means for performing luma mapping on the one or more other intermediate prediction blocks according to LMCS to form one or more other prediction blocks for the current block; means for generating a final prediction block for the current block using the first prediction block and the one or more other prediction blocks according to OBMC; and means for decoding the current block using the final prediction block.

Clause 27: A device for decoding video data, the device comprising: means for determining that a current block of video data is coded using combined inter/intra prediction (CIIP) mode, overlapped block motion compensation (OBMC), and luma mapping with chroma scaling (LMCS); means for generating an intermediate inter-prediction block for the current block using motion information of the current block; means for performing luma mapping on the intermediate inter-prediction block according to LMCS to form a final inter-prediction block for the current block; means for generating an intra-prediction block for the current block; means for performing CIIP to combine the final inter-prediction block with the intra-prediction block to form a first prediction block for the current block; means for generating one or more other prediction blocks for the current block using motion information of one or more neighboring blocks to the current block; means for generating a final prediction block for the current block using the first prediction block and the one or more other prediction blocks according to OBMC; and means for decoding the current block using the final prediction block.

Clause 28: A method of decoding video data, the method comprising: generating an inter-prediction block for a current block of video data; generating an intra-prediction block for the current block of video data; generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decoding the current block of video data using the final prediction block.

Clause 29: The method of clause 28, wherein generating the final prediction block for the current block of video data includes: performing OBMC on the inter-prediction block to form an OBMC compensated inter-prediction block; performing LMCS on the OBMC compensated inter-prediction block to form an LMCS mapped inter-prediction block; and combining the LMCS mapped inter-prediction block with the intra-prediction block using CIIP mode to generate the final prediction block.

Clause 30: The method of clause 28, wherein the inter-prediction block comprises a first inter-prediction sub-block of the current block of video data, the method further comprising generating a second inter-prediction sub-block for the current block, wherein generating the final prediction block for the current block of video data includes: performing LMCS on the first inter-prediction sub-block to form an LMCS mapped first inter-prediction sub-block; combining the LMCS mapped first inter-prediction sub-block with the intra-prediction block using CIIP mode to generate a first CIIP prediction sub-block for the current block; and performing OBMC blending between the first CIIP prediction sub-block and the second inter-prediction sub-block to generate the final prediction block.

Clause 31: The method of clause 30, further comprising performing LMCS on the second inter-prediction sub-block prior to performing the OBMC blending.

Clause 32: The method of clause 28, wherein the inter-prediction block comprises a first inter-prediction sub-block of the current block of video data, the method further comprising: generating a second inter-prediction sub-block for the current block; and performing LMCS on the second inter-prediction sub-block to form an LMCS mapped second inter-prediction sub-block, wherein generating the final prediction block for the current block of video data includes: performing LMCS on the first inter-prediction sub-block to form an LMCS mapped first inter-prediction sub-block; combining the LMCS mapped first inter-prediction sub-block with the intra-prediction block using CIIP mode to generate a first CIIP prediction sub-block for the current block; and performing OBMC blending between the first CIIP prediction sub-block and the LMCS mapped second inter-prediction sub-block to generate the final prediction block.

Clause 33: The method of clause 28, further comprising: coding an OBMC syntax element for the current block indicating that the current block is to be predicted using OBMC; coding a CIIP syntax element for the current block indicating that the current block is to be predicted using CIIP; and coding an LMCS syntax element for the current block indicating that the current block is to be predicted using LMCS.

Clause 34: The method of clause 33, wherein coding the CIIP syntax element comprises coding the CIIP syntax element after coding the OBMC syntax element.

Clause 35: The method of clause 28, further comprising encoding the current block prior to decoding the current block.

Clause 36: A device for decoding video data, the device comprising: a memory configured to store video data; and one or more processors implemented in circuitry and configured to: generate an inter-prediction block for a current block of the video data; generate an intra-prediction block for the current block of the video data; generate a final prediction block for the current block of the video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of the video data using the final prediction block.

Clause 37: The device of clause 36, wherein to generate the final prediction block for the current block of video data, the one or more processors are configured to: perform OBMC on the inter-prediction block to form an OBMC compensated inter-prediction block; perform LMCS on the OBMC compensated inter-prediction block to form an LMCS mapped inter-prediction block; and combine the LMCS mapped inter-prediction block with the intra-prediction block using CIIP mode to generate the final prediction block.

Clause 38: The device of clause 36, wherein the inter-prediction block comprises a first inter-prediction sub-block of the current block of video data, wherein the one or more processors are further configured to generate a second inter-prediction sub-block for the current block, wherein to generate the final prediction block for the current block of video data, the one or more processors are configured to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the second inter-prediction sub-block to generate the final prediction block.

Clause 39: The device of clause 38, wherein the one or more processors are further configured to perform LMCS on the second inter-prediction sub-block prior to performing the OBMC blending.

Clause 40: The device of clause 36, wherein the inter-prediction block comprises a first inter-prediction sub-block of the current block of video data, and wherein the one or more processors are further configured to: generate a second inter-prediction sub-block for the current block; and perform LMCS on the second inter-prediction sub-block to form an LMCS mapped second inter-prediction sub-block, wherein to generate the final prediction block for the current block of video data, the one or more processors are configured to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the LMCS mapped second inter-prediction sub-block to generate the final prediction block.

Clause 41: The device of clause 36, wherein the one or more processors are further configured to: code an OBMC syntax element for the current block indicating that the current block is to be predicted using OBMC; code a CIIP syntax element for the current block indicating that the current block is to be predicted using CIIP; and code an LMCS syntax element for the current block indicating that the current block is to be predicted using LMCS.

Clause 42: The device of clause 41, wherein the one or more processors are configured to code the CIIP syntax element after coding the OBMC syntax element.

Clause 43: The device of clause 36, wherein the one or more processors are further configured to encode the current block prior to decoding the current block.

Clause 44: The device of clause 36, further comprising a display configured to display the decoded video data.

Clause 45: The device of clause 36, wherein the device comprises one or more of a camera, a computer, a mobile device, a broadcast receiver device, or a set-top box.

Clause 46: A computer-readable storage medium having stored thereon instructions that, when executed, cause a processor of a device for decoding video data to: generate an inter-prediction block for a current block of video data; generate an intra-prediction block for the current block of video data; generate a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of video data using the final prediction block.

Clause 47: The computer-readable storage medium of clause 46, wherein the instructions that cause the processor to generate the final prediction block for the current block of video data include instructions that cause the processor to: perform OBMC on the inter-prediction block to form an OBMC compensated inter-prediction block; perform LMCS on the OBMC compensated inter-prediction block to form an LMCS mapped inter-prediction block; and combine the LMCS mapped inter-prediction block with the intra-prediction block using CIIP mode to generate the final prediction block.

Clause 48: The computer-readable storage medium of clause 46, wherein the inter-prediction block comprises a first inter-prediction sub-block of the current block of video data, further comprising instructions that cause the processor to generate a second inter-prediction sub-block for the current block, wherein the instructions that cause the processor to generate the final prediction block for the current block of video data include instructions that cause the processor to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the second inter-prediction sub-block to generate the final prediction block.

Clause 49: The computer-readable storage medium of clause 48, further comprising instructions that cause the processor to perform LMCS on the second inter-prediction sub-block prior to performing the OBMC blending.

Clause 50: The computer-readable storage medium of clause 46, wherein the inter-prediction block comprises a first inter-prediction sub-block of the current block of video data, further comprising instructions that cause the processor to: generate a second inter-prediction sub-block for the current block; and perform LMCS on the second inter-prediction sub-block to form an LMCS mapped second inter-prediction sub-block, wherein the instructions that cause the processor to generate the final prediction block for the current block of video data include instructions that cause the processor to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the LMCS mapped second inter-prediction sub-block to generate the final prediction block.

Clause 51: The computer-readable storage medium of clause 46, further comprising instructions that cause the processor to: code an OBMC syntax element for the current block indicating that the current block is to be predicted using OBMC; code a CIIP syntax element for the current block indicating that the current block is to be predicted using CIIP; and code an LMCS syntax element for the current block indicating that the current block is to be predicted using LMCS.

Clause 52: The computer-readable storage medium of clause 51, wherein the instructions that cause the processor to code the CIIP syntax element comprise instructions that cause the processor to code the CIIP syntax element after coding the OBMC syntax element.

Clause 53: The computer-readable storage medium of clause 46, further comprising instructions that cause the processor to encode the current block prior to decoding the current block.

Clause 54: A device for decoding video data, the device comprising: means for generating an inter-prediction block for a current block of video data; means for generating an intra-prediction block for the current block of video data; means for generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and means for decoding the current block of video data using the final prediction block.

Clause 55: The device of clause 54, wherein the inter-prediction block comprises a first inter-prediction sub-block of the current block of video data, further comprising means for generating a second inter-prediction sub-block for the current block, wherein the means for generating the final prediction block for the current block of video data includes: means for performing LMCS on the first inter-prediction sub-block to form an LMCS mapped first inter-prediction sub-block; means for combining the LMCS mapped first inter-prediction sub-block with the intra-prediction block using CIIP mode to generate a first CIIP prediction sub-block for the current block; and means for performing OBMC blending between the first CIIP prediction sub-block and the second inter-prediction sub-block to generate the final prediction block.

Clause 56: A method of decoding video data, the method comprising: generating an inter-prediction block for a current block of video data; generating an intra-prediction block for the current block of video data; generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decoding the current block of video data using the final prediction block.

Clause 57: The method of clause 56, wherein generating the final prediction block for the current block of video data includes: performing OBMC on the inter-prediction block to form an OBMC compensated inter-prediction block; performing LMCS on the OBMC compensated inter-prediction block to form an LMCS mapped inter-prediction block; and combining the LMCS mapped inter-prediction block with the intra-prediction block using CIIP mode to generate the final prediction block.

Clause 58: The method of clause 56, wherein the inter-prediction block comprises a first inter-prediction sub-block of the current block of video data, the method further comprising generating a second inter-prediction sub-block for the current block, wherein generating the final prediction block for the current block of video data includes: performing LMCS on the first inter-prediction sub-block to form an LMCS mapped first inter-prediction sub-block; combining the LMCS mapped first inter-prediction sub-block with the intra-prediction block using CIIP mode to generate a first CIIP prediction sub-block for the current block; and performing OBMC blending between the first CIIP prediction sub-block and the second inter-prediction sub-block to generate the final prediction block.

Clause 59: The method of clause 58, further comprising performing LMCS on the second inter-prediction sub-block prior to performing the OBMC blending.

Clause 60: The method of clause 56, wherein the inter-prediction block comprises a first inter-prediction sub-block of the current block of video data, the method further comprising: generating a second inter-prediction sub-block for the current block; and performing LMCS on the second inter-prediction sub-block to form an LMCS mapped second inter-prediction sub-block, wherein generating the final prediction block for the current block of video data includes: performing LMCS on the first inter-prediction sub-block to form an LMCS mapped first inter-prediction sub-block; combining the LMCS mapped first inter-prediction sub-block with the intra-prediction block using CIIP mode to generate a first CIIP prediction sub-block for the current block; and performing OBMC blending between the first CIIP prediction sub-block and the LMCS mapped second inter-prediction sub-block to generate the final prediction block.

Clause 61: The method of any of clauses 56-60, further comprising: coding an OBMC syntax element for the current block indicating that the current block is to be predicted using OBMC; coding a CIIP syntax element for the current block indicating that the current block is to be predicted using CIIP; and coding an LMCS syntax element for the current block indicating that the current block is to be predicted using LMCS.

Clause 62: The method of clause 61, wherein coding the CIIP syntax element comprises coding the CIIP syntax element after coding the OBMC syntax element.

Clause 63: The method of any of clauses 56-62, further comprising encoding the current block prior to decoding the current block.

Clause 64: A device for decoding video data, the device comprising: a memory configured to store video data; and one or more processors implemented in circuitry and configured to: generate an inter-prediction block for a current block of the video data; generate an intra-prediction block for the current block of the video data; generate a final prediction block for the current block of the video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of the video data using the final prediction block.

Clause 65: The device of clause 64, wherein to generate the final prediction block for the current block of video data, the one or more processors are configured to: perform OBMC on the inter-prediction block to form an OBMC compensated inter-prediction block; perform LMCS on the OBMC compensated inter-prediction block to form an LMCS mapped inter-prediction block; and combine the LMCS mapped inter-prediction block with the intra-prediction block using CIIP mode to generate the final prediction block.

Clause 66: The device of clause 64, wherein the inter-prediction block comprises a first inter-prediction sub-block of the current block of video data, wherein the one or more processors are further configured to generate a second inter-prediction sub-block for the current block, wherein to generate the final prediction block for the current block of video data, the one or more processors are configured to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the second inter-prediction sub-block to generate the final prediction block.

Clause 67: The device of clause 66, wherein the one or more processors are further configured to perform LMCS on the second inter-prediction sub-block prior to performing the OBMC blending.

Clause 68: The device of clause 64, wherein the inter-prediction block comprises a first inter-prediction sub-block of the current block of video data, and wherein the one or more processors are further configured to: generate a second inter-prediction sub-block for the current block; and perform LMCS on the second inter-prediction sub-block to form an LMCS mapped second inter-prediction sub-block, wherein to generate the final prediction block for the current block of video data, the one or more processors are configured to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the LMCS mapped second inter-prediction sub-block to generate the final prediction block.

Clause 69: The device of any of clauses 64-68, wherein the one or more processors are further configured to: code an OBMC syntax element for the current block indicating that the current block is to be predicted using OBMC; code a CIIP syntax element for the current block indicating that the current block is to be predicted using CIIP; and code an LMCS syntax element for the current block indicating that the current block is to be predicted using LMCS.

Clause 70: The device of clause 69, wherein the one or more processors are configured to code the CIIP syntax element after coding the OBMC syntax element.

Clause 71: The device of any of clauses 64-70, wherein the one or more processors are further configured to encode the current block prior to decoding the current block.

Clause 72: The device of any of clauses 64-71, further comprising a display configured to display the decoded video data.

Clause 73: The device of any of clauses 64-72, wherein the device comprises one or more of a camera, a computer, a mobile device, a broadcast receiver device, or a set-top box.

Clause 74: A computer-readable storage medium having stored thereon instructions that, when executed, cause a processor of a device for decoding video data to: generate an inter-prediction block for a current block of video data; generate an intra-prediction block for the current block of video data; generate a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and decode the current block of video data using the final prediction block.

Clause 75: The computer-readable storage medium of clause 74, wherein the instructions that cause the processor to generate the final prediction block for the current block of video data include instructions that cause the processor to: perform OBMC on the inter-prediction block to form an OBMC compensated inter-prediction block; perform LMCS on the OBMC compensated inter-prediction block to form an LMCS mapped inter-prediction block; and combine the LMCS mapped inter-prediction block with the intra-prediction block using CIIP mode to generate the final prediction block.

Clause 76: The computer-readable storage medium of clause 74, wherein the inter-prediction block comprises a first inter-prediction sub-block of the current block of video data, further comprising instructions that cause the processor to generate a second inter-prediction sub-block for the current block, wherein the instructions that cause the processor to generate the final prediction block for the current block of video data include instructions that cause the processor to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the second inter-prediction sub-block to generate the final prediction block.

Clause 77: The computer-readable storage medium of clause 76, further comprising instructions that cause the processor to perform LMCS on the second inter-prediction sub-block prior to performing the OBMC blending.

Clause 78: The computer-readable storage medium of clause 74, wherein the inter-prediction block comprises a first inter-prediction sub-block of the current block of video data, further comprising instructions that cause the processor to: generate a second inter-prediction sub-block for the current block; and perform LMCS on the second inter-prediction sub-block to form an LMCS mapped second inter-prediction sub-block, wherein the instructions that cause the processor to generate the final prediction block for the current block of video data include instructions that cause the processor to: perform LMCS on the first inter-prediction sub-block to form an LMCS mapped first inter-prediction sub-block; combine the LMCS mapped first inter-prediction sub-block with the intra-prediction block using CIIP mode to generate a first CIIP prediction sub-block for the current block; and perform OBMC blending between the first CIIP prediction sub-block and the LMCS mapped second inter-prediction sub-block to generate the final prediction block.

Clause 79: The computer-readable storage medium of any of clauses 74-78, further comprising instructions that cause the processor to: code an OBMC syntax element for the current block indicating that the current block is to be predicted using OBMC; code a CIIP syntax element for the current block indicating that the current block is to be predicted using CIIP; and code an LMCS syntax element for the current block indicating that the current block is to be predicted using LMCS.

Clause 80: The computer-readable storage medium of clause 79, wherein the instructions that cause the processor to code the CIIP syntax element comprise instructions that cause the processor to code the CIIP syntax element after coding the OBMC syntax element.

Clause 81: The computer-readable storage medium of any of clauses 74-80, further comprising instructions that cause the processor to encode the current block prior to decoding the current block.

Clause 82: A device for decoding video data, the device comprising: means for generating an inter-prediction block for a current block of video data; means for generating an intra-prediction block for the current block of video data; means for generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block; and means for decoding the current block of video data using the final prediction block.

Clause 83: The device of clause 82, wherein the inter-prediction block comprises a first inter-prediction sub-block of the current block of video data, further comprising means for generating a second inter-prediction sub-block for the current block, wherein the means for generating the final prediction block for the current block of video data includes: means for performing LMCS on the first inter-prediction sub-block to form an LMCS mapped first inter-prediction sub-block; means for combining the LMCS mapped first inter-prediction sub-block with the intra-prediction block using CIIP mode to generate a first CIIP prediction sub-block for the current block; and means for performing OBMC blending between the first CIIP prediction sub-block and the second inter-prediction sub-block to generate the final prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
generating an inter-prediction predictor block for a current block of video data;
generating an intra-prediction predictor block for the current block of video data;
generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block comprising:
performing OBMC on the inter-prediction predictor block to form an OBMC compensated inter-prediction predictor block;
prior to combining inter-prediction and intra-prediction predictor blocks as part of performing CIIP mode, performing LMCS on the OBMC compensated inter-prediction predictor block to form an LMCS mapped OBMC inter-prediction predictor block; and
combining the LMCS mapped OBMC inter-prediction predictor block with the intra-prediction predictor block using CIIP mode to generate the final prediction block; and
decoding the current block of video data using the final prediction block.

2. The method of claim 1, further comprising:
coding an OBMC syntax element for the current block indicating that the current block is to be predicted using OBMC;
coding a CIIP syntax element for the current block indicating that the current block is to be predicted using CIIP; and
coding an LMCS syntax element for the current block indicating that the current block is to be predicted using LMCS.

3. The method of claim 2, wherein coding the CIIP syntax element comprises coding the CIIP syntax element after coding the OBMC syntax element.

4. A device for decoding video data, the device comprising:
a memory configured to store video data; and
one or more processors implemented in circuitry and configured to:
generate an inter-prediction block for a current block of the video data;
generate an intra-prediction block for the current block of the video data;
generate a final prediction block for the current block of the video data from the inter-prediction block and the intra-prediction block, including performing each of combined inter/intra prediction (CIIP) mode, overlapped block motion compensation (OBMC), and luma mapping with chroma scaling (LMCS) while generating the final prediction block wherein to generate the final prediction block the one or more processors are further configured to:
- perform OBMC on the inter-prediction predictor block to form an OBMC compensated inter-prediction predictor block;
- prior to combining inter-prediction and intra-prediction predictor blocks as part of performing CIIP mode, perform LMCS on the OBMC compensated inter-prediction predictor block to form an LMCS mapped OBMC inter-prediction predictor block; and
- combine the LMCS mapped OBMC inter-prediction predictor block with the intra-prediction predictor block using CIIP mode to generate the final prediction block; and
- decode the current block of the video data using the final prediction block.

5. The device of claim 4, wherein the one or more processors are further configured to:
- code an OBMC syntax element for the current block indicating that the current block is to be predicted using OBMC;
- code a CIIP syntax element for the current block indicating that the current block is to be predicted using CIIP; and
- code an LMCS syntax element for the current block indicating that the current block is to be predicted using LMCS.

6. The device of claim 5, wherein the one or more processors are configured to code the CIIP syntax element after coding the OBMC syntax element.

7. The device of claim 4, further comprising a display configured to display the decoded video data.

8. The device of claim 4, wherein the device comprises one or more of a camera, a computer, a mobile device, a broadcast receiver device, or a set-top box.

9. A computer-readable storage medium having stored thereon instructions that, when executed, cause a processor of a device for decoding video data to:
- generate an inter-prediction block for a current block of video data;
- generate an intra-prediction block for the current block of video data;
- generate a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block, wherein to generate the final prediction block the instructors further cause the processor to:
  - perform OBMC on the inter-prediction predictor block to form an OBMC compensated inter-prediction predictor block;
  - prior to combining inter-prediction and intra-prediction predictor blocks as part of performing CIIP mode, perform LMCS on the OBMC compensated inter-prediction predictor block to form an LMCS mapped OBMC inter-prediction predictor block; and
  - combine the LMCS mapped OBMC inter-prediction predictor block with the intra-prediction predictor block using CIIP mode to generate the final prediction block; and
- decode the current block of video data using the final prediction block.

10. The computer-readable storage medium of claim 9, further comprising instructions that cause the processor to:
- code an OBMC syntax element for the current block indicating that the current block is to be predicted using OBMC;
- code a CIIP syntax element for the current block indicating that the current block is to be predicted using CIIP; and
- code an LMCS syntax element for the current block indicating that the current block is to be predicted using LMCS.

11. The computer-readable storage medium of claim 10, wherein the instructions that cause the processor to code the CIIP syntax element comprise instructions that cause the processor to code the CIIP syntax element after coding the OBMC syntax element.

12. A device for decoding video data, the device comprising:
- means for generating an inter-prediction block for a current block of video data;
- means for generating an intra-prediction block for the current block of video data;
- means for generating a final prediction block for the current block of video data from the inter-prediction block and the intra-prediction block, including performing each of combined inter/intra prediction (CIIP) mode, overlapped block motion compensation (OBMC), and luma mapping with chroma scaling (LMCS) while generating the final prediction block, comprising:
  - means for performing OBMC on the inter-prediction predictor block to form an OBMC compensated inter-prediction predictor block;
  - means for performing LMCS on the OBMC compensated inter-prediction predictor block to form an LMCS mapped OBMC inter-prediction predictor block prior to combining inter-prediction and intra-prediction predictor blocks as part of performing CIIP mode; and
  - means for combining the LMCS mapped OBMC inter-prediction predictor block with the intra-prediction predictor block using CIIP mode to generate the final prediction block; and
- means for decoding the current block of video data using the final prediction block.

* * * * *